(12) United States Patent
Chen et al.

(10) Patent No.: US 6,189,386 B1
(45) Date of Patent: Feb. 20, 2001

(54) METHOD OF USING A MICROSCOPIC DIGITAL IMAGING STRAIN GAUGE

(75) Inventors: Fang Chen, Rochester Hills; Anthony M. Waas, Saline; Everett You-Ming Kuo, Troy; Howard Kiel Plummer, Jr., Dearborn; Thomas Eugene Allen, Royal Oak, all of MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 08/985,676

(22) Filed: Dec. 5, 1997

(51) Int. Cl.⁷ .............................. G01B 11/14; G01N 3/08
(52) U.S. Cl. .................................................. 73/800
(58) Field of Search .................. 73/800; 356/32

(56) References Cited

U.S. PATENT DOCUMENTS

| | | | |
|---|---|---|---|
| 3,985,444 | * 10/1976 | Takashima et al. | 356/109 |
| 4,342,907 | * 8/1982 | Macedo et al. | 73/800 |
| 4,591,996 | 5/1986 | Vachon . | |
| 4,690,001 | 9/1987 | Harvey et al. . | |
| 4,722,600 | * 2/1988 | Chiang | 73/800 |
| 4,869,110 | 9/1989 | Kent et al. . | |
| 5,011,280 | 4/1991 | Hung . | |
| 5,257,088 | 10/1993 | Tyson et al. . | |
| 5,341,204 | 8/1994 | Grant et al. . | |
| 5,568,259 | 10/1996 | Kamegawa . | |
| 5,757,473 | * 5/1998 | Kanduth et al. | 356/32 |

FOREIGN PATENT DOCUMENTS 404127005   4/1992   (JP) .

* cited by examiner

Primary Examiner—Max Noori
(74) Attorney, Agent, or Firm—Raymond Coppiellie

(57) ABSTRACT

A method of using a microscopic digital imaging strain gauge includes the steps of creating a mark pattern on an object surface, positioning an image sensing device over the mark pattern, magnifying the mark pattern with a magnification lens, taking a first magnified image of the mark pattern with the image sensing device, applying a load to the object surface, taking a second magnified image of the mark pattern, and utilizing a processor to calculate the strain as derived from the first and second magnified images.

20 Claims, 1 Drawing Sheet

METHOD OF USING A MICROSCOPIC DIGITAL IMAGING STRAIN GAUGE

FIELD OF THE INVENTION

The present invention relates to microscopic digital imaging strain gauges, and more specifically, to a method of using such a gauge.

BACKGROUND OF THE INVENTION

Strain measurement is of particular importance to automotive vehicle designers. Conventional strain measurement is often conducted using an electrical strain gauge. Resistance strain gauges, extensometers, and capacitor strain gauges are examples of such conventional electrical gauges. In the design of automotive vehicles it is often necessary to measure hundreds of locations for strain for any given test. Electrical strain gauges require bonding and wiring which, in an automotive testing environment, is a time consuming set up process. Also, once an electrical strain gauge is used it must be discarded which can be very costly in automotive testing. Further, conventional strain gauges are inaccurate when exposed to high temperatures and high successive loading which is an undesirable testing limitation in automotive design.

Efforts have therefore advanced in the automotive strain measurement field to develop a noncontacting and nonconsumable method of measuring strain. One such method is known as shearography. According to this method, two laterally-displaced images of the object, which consist of random speckle patterns, are made to interfere to form a single speckle pattern. The pattern is random, and depends on the characteristics of the surface of the object. When the object is deformed, by temperature, pressure, or other means, the random interference pattern will change. The amount of the change depends on the soundness of the object. A comparison of the random speckle patterns for the deformed and undeformed states, which forms a fringe pattern, gives information about the structural integrity of the object. The method is called shearography because one image of the object is laterally-displaced, or sheared, relative to the other image.

Another noncontacting and nonconsumable strain measurement method, which was developed with the advent of the laser, is electronic speckle pattern interferometry (ESPI). In ESPI, a beam of laser light is directed onto the test object and reflected onto an image sensor. At the same time, a reference beam is also directed towards the sensor. The reference beam may be a "pure" beam or it may be reflected from a "reference" object. Both the object beam and the reference beam are nearly parallel when they reach the image sensor, so the spatial frequency of the interference speckle patterns is relatively low. Thus, the image sensor can be a video camera, or its equivalent.

There are many disadvantages associated with shearography and ESPI. ESPI requires an object beam and a reference beam of coherent light. The presence of two distinct beams increases the complexity of the optical system. The ratio of intensities of the object and reference beams must be carefully controlled, and the path lengths of the beams must be matched. Also, the use of lasers present safety issues as well as high cost. Both ESPI and shearography are full field strain measurement methods and require highly complex, and relatively inaccurate, computational methods to derive strain. Further, ESPI and shearography are highly sensitive to vibration. The slightest movement of either the object or the apparatus can ruin the pattern. Thus both methods require special vibration isolation precautions, and are not yet practical for strain measurement in an automotive vehicle testing environment. Still further, both methods require that the entire object surface be painted or processed for testing which adds cost to the process. Finally, ESPI and shearography methods create speckle noise which must be filtered by a noise reduction algorithm, further adding to the cumbersome nature of the processes.

Interferometric point wise, rather than full field, strain measurement is also an example of noncontacting strain measurement but is subject to the same shortcomings as ESPI. A problem associated with both full field and point wise noncontacting strain measurement, which is of great importance in automotive design and testing, is the method uninteruptibility. Put another way, once the particular apparatus is set up to measure strain it can not be removed in-between pre and post-loading. In automotive testing it is desired to take an initial, pre-load reading with the testing apparatus and then remove the apparatus for cycling. The automobile could, for example, be cycled for a predetermined period of time or distance with the apparatus being reapplied to the testing area for a post-load reading. This technique is impossible with the aforementioned noncontacting strain measurement methods.

Accordingly, it is seen that a need exists in the art for a method of using an automotive vehicle strain gauge which is noncontacting, has an uncomplicated strain measurement calculation, is not subject to the harsh vibratory environment of an automobile, is removable between the pre versus post loading phase, and is reusable, accurate, and easy to use.

SUMMARY OF THE INVENTION

Responsive to the deficiencies in the prior art, the present invention provides a method of using a microscopic digital imaging strain gauge including the steps of creating a mark pattern on an object surface, positioning an image sensing device over the mark pattern, magnifying the mark pattern with a magnification lens, taking a first magnified image of the mark pattern with the image sensing device, applying a load to the object surface, taking a second magnified image of the mark pattern, and utilizing a processor to calculate the strain as derived from the first and second magnified images.

An advantage of the present invention is that the present apparatus utilizes a microscopic lens which does not require a complex and sensitive optical system, therefore the present gauge may be removed from the object surface between the pre and post loading phases.

BRIEF DESCRIPTION OF THE DRAWINGS

Other features and advantages of the present invention will become apparent to those skilled in the strain measurement related arts upon reading the following description with reference to the accompanying drawings, in which.

DETAILED DESCRIPTION OF THE PREFERRED EMBODIMENT

Figure 1:
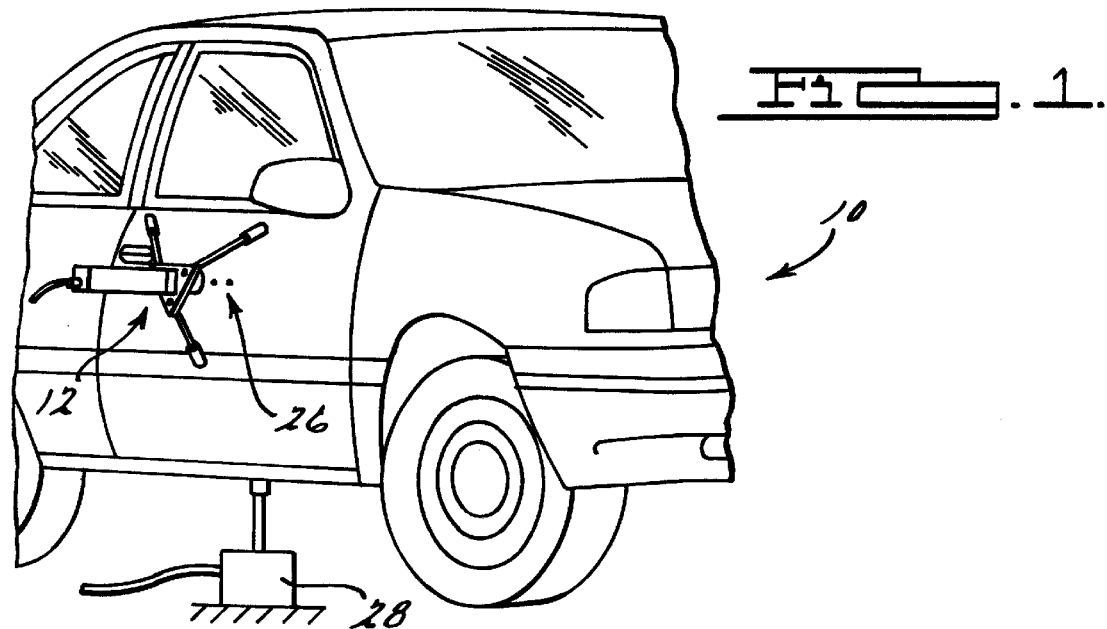
FIG. 1 is a perspective view of an automotive vehicle with the present strain measurement apparatus situated adjacent a vehicle door.

Turning now to the drawings, and in particular to FIG. 1 thereof an automotive vehicle 10 has positioned adjacent thereto a microscopic digital imaging strain gauge 12. The gauge 12 of FIG. 2 includes, a positioning mechanism 14, an image sensing device 16, a magnification lens 18, and a processor 20. The gauge 12 is positioned to image a micro/nano indentation, or micro/nano lithographic mark pattern 26 on an object surface for determining strain. The mark pattern 26 may also be produced on a thin metal or composite sheet and then adhere to the object surface. A dynamic loading device 28 with a trigger system may also be included, as well as coupled to the processor 20, for dynamic load strain testing.

Figure 2:
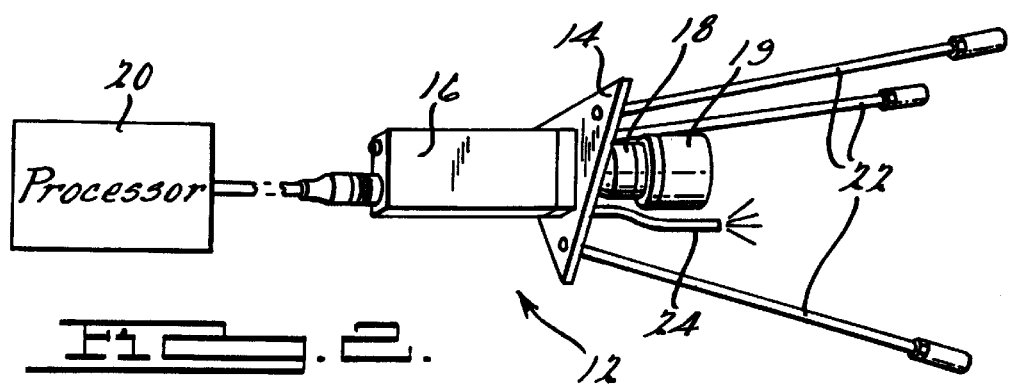
FIG. 2 is a perspective view of a microscopic digital imaging strain gauge according to the present invention.
Figure 3:
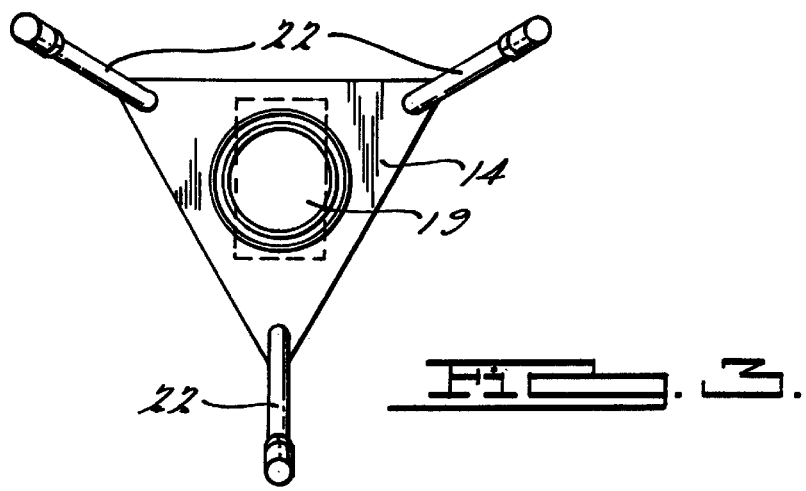
FIG. 3 is a bottom view of a microscopic digital imaging strain gauge according to the present invention.

As shown in FIG. 2, the image sensing device 16 is preferably a digital video recorder. The recorder may operate in either a color or gray scale. The sensing device 16 has a lens 19. The lens 19 is preferably a telecentric lens so that the size of the mark pattern will not be affected by the view angle and focus distance, especially in the case of a curved object surface. The sensing device 16 may further include a shutter mechanism, not shown, for taking "snap-shot" images of the object surface mark pattern 26 under dynamic loading.

A magnification lens 18, preferably a microscopic magnification lens, is preferably optically coupled to the lens 19 and is positioned intermediate the sensing device 16 and the lens 19. However, the lens 19 may be intermediate the magnification lens 18 and the image sensing device 16 or may be formed integral with the magnification lens 18. Further, an optical, scanning electron, or scanning probe microscope may be used in place of the microscopic magnification lens without departing from the scope of the herein described invention.

A positioning mechanism 14 is attached to the sensing device 16. The positioning mechanism 14 preferably has three equidistantly spaced legs 22. The legs 22 are adapted to be longitudinally adjusted and locked in to place at a predetermined elevation above the object surface.

A fiber optic light source 24 may be attached to the apparatus 12 to illuminate a dimly lit object surface.

A processor 20 is coupled to the sensing device 16 and is adapted to receive a digital image. The processor has a digital imaging board with preferably a 30 Hertz digitizing rate. However, a high speed imaging board may be coupled with a high speed imaging device if the operating environment of the object surface so requires. The processor further has a computer for receiving information from the imaging board and for calculating the strain associated with a given object surface. The calculation utilizes a Young's fringe phase shift technique, as explained below and as known in the art, to interpret pre-load and post-load object surfaces. The Young's fringes are preferably processed using a low pass filter. The processor 20 may further be utilized to coordinate the trigger system of the dynamic loading device 28 with the shutter mechanism of the image sensing device 16 so that upon each triggered incremental dynamic load application, a "snap-shot" of the mark pattern 26 is taken.

In use, the positioning mechanism 14 is placed over a mark pattern 26 on an object surface and the distance between the imaging sensing device 16 and the mark pattern 26 is set by the adjustable legs and locked into place. The lens 19 is focused and the mark pattern image is taken by the image sensing device 16 before and after loading. The gauge 12 may be removed if desired between pre and post-loading. The images are digitized into the computer via the digital imaging board. A digital Fourier transformation is then applied to the marks before and after loading to produce Young's fringes. The number of fringes are related to the degree of distance between marked points. The distance, as derived from the fringe patterns, between points of the mark pattern 26, pre and post deformation, are used to calculate strain at that region.

This method is advantageous because of the method interruptibility. Put another way, once the gauge 12 is used to take an initial pre-load reading it can be removed prior to the post-load reading and during loading. This is advantageous in automotive testing because multiple mark patterns can be made on an automobile, and imaged with the gauge 12, without the difficulty of bonding and wiring associated with electrical strain gauges, and with the ability to cycle the automobile in the field. The ability to cycle an automobile in the field is impossible with existing noncontacting strain measurement methods.

Only one embodiment of a method of using a microscopic digital imaging strain gauge of the present invention has been described. Those skilled in the strain gauge arts will appreciate that others may be possible without departing from the scope of the following claims.

We claim:

1. A method of using a digital imaging strain gauge comprising the steps of:

creating a known mark pattern on an object surface;

positioning an image sensing device over the mark pattern a predetermined distance therefrom;

magnifying the known mark pattern with a microscopic magnification lens;

recording a first magnified image of the mark pattern from the microscopic magnification lens with the image sensing device;

removing sensing device from object surface and then repositioning the sensing device over the same object surface using reregistration to the known mark pattern;

applying a load to the object surface;

recording a second magnified image of the mark pattern from the microscopic magnification lens; and determining the strain as derived from the first and second magnified images using Young's fringe Phase shift.

2. A method of using a microscopic digital imaging strain gauge according to claim 1 wherein, the known mark pattern is created by indenting a mark pattern on the object surface.

3. A method of using a microscopic digital imaging strain gauge according to claim 1 wherein, the known mark pattern is created by marking an equi-spaced a mark pattern on the object surface.

4. A method of using a microscopic digital imaging strain gauge according to claim 1 wherein, the known mark pattern is made on an order of one of a micro or nano scale.

5. A method of using a microscopic digital imaging strain gauge according to claim 1 wherein, the step of positioning an image sensing device includes adjusting and locking into place a plurality of adjustable leg portions.

6. A method of using a microscopic digital imaging strain gauge according to claim 1, further including the step of receiving the first and second magnified images by an image capture means.

7. A method of using a microscopic digital imaging strain gauge according to claim 6, further including the step of communicating the first and second magnified images received by the image capture means to a processing means.

8. A method of using a microscopic digital imaging strain gauge according to claim 1, wherein the step of creating a mark pattern on an object surface further includes the step of adhering the object surface to a structure to be loaded.

9. A method of using a digital imaging strain gauge comprising the steps of:

creating a known mark pattern on an object surface;

positioning an image sensing device over the mark pattern a predetermined distance therefrom;

magnifying the known mark pattern with a microscopic magnification lens;

taking a first magnified image of the mark pattern from the microscopic magnification lens with the image sensing device;

removing the image sensing device from over the known mark pattern;

applying a load to the object surface;

reregistering the image sensing device a distance equivalent to the predetermined distance over the known mark pattern;

taking a second magnified image of the known mark pattern from the microscopic magnification lens; and utilizing a processing means to calculate the strain as derived from the first and second magnified images.

10. A method of using a microscopic digital imaging strain gauge according to claim 9 wherein, the step of creating a known mark pattern is by indenting a mark pattern on the object surface.

11. A method of using a microscopic digital imaging strain gauge according to claim 9 wherein, the step of creating a known mark pattern is by marking a mark pattern on the object surface.

12. A method of using a microscopic digital imaging strain gauge according to claim 9 wherein, the mark pattern is made on an order of one of a known micro or nano scale.

13. A method of using a microscopic digital imaging strain gauge according to claim 9 wherein, the step of positioning an image sensing device includes adjusting and locking into place a plurality of adjustable leg portions.

14. A method of using a microscopic digital imaging strain gauge according to claim 9, further including the step of receiving the first and second magnified images by an image capture means.

15. A method of using a microscopic digital imaging strain gauge according to claim 14, further including the step of communicating the first and second magnified images received by the image capture means to the processing means.

16. A method of using a microscopic digital imaging strain gauge according to claim 9, wherein the step of creating a known mark pattern on an object surface further includes the step of adhering the object surface to a structure to be loaded.

17. A method of using a digital imaging strain gauge comprising the steps of:

creating a known mark pattern on an object surface;

positioning an image sensing device over the mark pattern a predetermined distance therefrom;

magnifying the mark pattern with a microscopic magnification lens;

taking a first magnified image of the mark pattern from the microscopic magnification lens with the image sensing device;

applying a successive load to the object surface;

taking a successive magnified image of the mark pattern from the magnification lens with each successive load; and utilizing a Young's fringe phase shift analysis processing means to calculate the dynamically loaded strain as derived from the first and successive magnified images.

18. A method of using a microscopic digital imaging strain gauge according to claim 17 wherein, the step of creating a known mark pattern is by indenting a mark pattern on the object surface.

19. A method of using a microscopic digital imaging strain gauge according to claim 17 wherein, the step of creating a known mark pattern is by marking a mark pattern on the object surface.

20. A method of using a microscopic digital imaging strain gauge according to claim 17 wherein, the mark pattern is made on the order of one of a micro or nano scale.

* * * * *